Patented Dec. 28, 1943

2,337,635

UNITED STATES PATENT OFFICE 2,337,635

VINYL RESIN COMPOSITION

Charles Bogin, Terre Haute, Ind., assignor to Commercial Solvents Corporation, Terre Haute, Ind., a corporation of Maryland No Drawing. Application October 31, 1941, Serial No. 417,358

5 Claims. (Cl. 260—32)

My invention relates to resin compositions for use in the manufacture of films, lacquers, varnishes, molding compositions, filaments, etc. It pertains particularly to compositions comprising polyvinyl acetal resins and solvents therefor.

The vinyl resins as a class possess a number of unusual properties which make them especially adaptable for various purposes in different industries, inasmuch as most of them are of unusual chemical and physical stability. They, however, possess defects which render their use for many purposes both impractical and expensive. This is particularly the case in the coating industries where solvents are necessary, since most of the vinyl resins are relatively insoluble in the commercially available solvent materials. This, as well as the requirements of various special uses, has led to the preparation of a number of types of vinyl resins possessing distinct properties and suitable for different purposes.

In United States Patent No. 2,192,583, granted March 5, 1940, to me, I have disclosed the use of the nitroalkanes as solvents for vinyl resins of the type produced by the conjoint polymerization of a vinyl halide with a vinyl ester of a lower aliphatic acid. I have now discovered that the nitroparaffins may also be satisfactorily employed as solvents for still another type of vinyl resins, namely, the modified vinyl resins resulting from partial hydrolysis of polymerized vinyl esters which are subsequently condensed with aldehydes or similar reagents to cause acetal formation. The vinyl resins resulting from the interaction of a lower aliphatic aldehyde such as formaldehyde with a partially hydrolyzed vinyl ester, have been found to be particularly suitable for the preparation of the compositions of my invention. Resins of the latter type are well known in the art as vinyl acetal resins and are sold under such trade names as "Formvar," "Alvar," etc. My present invention pertains to compositions comprising the latter type of vinyl resins and nitroalkanes, and particularly to coating compositions comprising such materials.

The nitroalkanes which I have found to be suitable for preparing solvent compositions comprising vinyl acetal resins may be produced in accordance with the process disclosed in U. S. Patent No. 1,967,667, granted July 24, 1934, to H. B. Hass, E. B. Hodge, and B. M. Vanderbilt, although they may, of course, be made by other processes, if desired. Any of the nitroalkanes of suitable chemical and physical characteristics may be employed as solvents for the vinyl acetal resins, depending upon the uses to which the compositions are to be applied and the other ingredients of the compositions. If, for example, the composition is to be used as a coating material to be applied by spray or brushing it is essential that the nitroalkane be selected with regard to its boiling point and rate of evaporation. Where, however, the composition is to be employed as a plastic, somewhat less consideration need be given to the latter factor, unless the material selected is to be used as a combination solvent-plasticizer in which case, of course, it is essential that the nitroalkane selected be of sufficiently high boiling point so that it will remain substantially intact in the molded compositions.

Nitroalkanes suitable for use in coating compositions comprising vinyl acetal resins include such materials as nitromethane, nitroethane, 1-nitropropane, 2-nitropropane, the nitrobutanes, the nitropentanes, etc., as well as mixtures thereof. The vinyl acetal resin known in the trade as "Formvar" is soluble in the first two of these nitroalkanes at ordinary temperatures, but heating for a short time at 50–60° C. is required for solution in 1-, and 2-nitropropane. Since, however, incorporation of an aliphatic alcohol, such as, for example, ethanol or butanol, renders the nitroalkane a more active solvent, it is generally preferable to effect solution with the higher nitroalkane in this way.

Other materials ordinarily used in coating and plastic compositions containing synthetic resins may also be employed in my improved compositions comprising vinyl acetal resins and nitroalkanes. For example, plasticizers such as camphor, cresyl phosphate, butyl phthalate, oxidizable oils, or the like may be incorporated. Other resins, either natural or synthetic, may likewise be used in the composition. Also, pigments or dyes may be included. In selecting the various ingredients, however, the usual precautions must be observed to choose materials substantially inert to the other substances present and which are preferably compatible therewith. In the latter connection, for example, I have found that the vinyl acetal resin known in the trade as "Formvar" is compatible with butyl phthalate and cresyl phosphate, but not with castor oil. Similarly, it is compatible with the synthetic resin designated as "Rezyl 19," but tends to give cloudy films when mixed with Damar or ester gum. The latter incompatibility, however, can be satisfactorily corrected by the proper selection of solvents and diluents, e. g., by proper adjustments in the proportions of butanol and xylol added to the compositions.

As in the case of most such compositions it is desirable, for purposes of effecting economies in the use of expensive solvent materials, to use diluents or non-solvents. The solvent properties of the nitroalkanes for "Formvar" make the use of high proportions of cheap diluents quite practical. "Formvar" is insoluble in such common solvent materials as acetone, methyl ethyl ketone, ethyl and butyl acetate, ethyl and butyl alcohols, "Cellosolve," "Methyl Cellosolve," "Cellosolve" acetate, benzene, toluene, petroleum naphtha, etc., as well as in mixtures of esters and ketones with alcohols, and hence such components may be regarded as diluents. The amount of such diluents which may be used in any particular composition depends upon the "tolerance," or amount of the particular diluent which may be added to a given volume of a solution of "Formvar" in a nitroalkane without causing precipitation of the "Formvar." Solutions of "Formvar" in 1-nitro-propane, for example, have very low tolerances for substances such as ethyl alcohol, butyl alcohol, ethyl acetate, butyl acetate, methyl ethyl ketone, toluene, etc., the tolerances being approximately 1.0 for each of these liquids. Nitroalkane solutions of "Formvar," however, have quite high tolerances for diluents comprising mixtures of alcohols and coal tar hydrocarbons, and especially for such mixtures high in toluene, as will be seen from the table shown below.

Table

| Composition of diluent mixture | Tolerances of a 15% solution of "Formvar" in a solution consisting of 50% 1-nitropropane, 25% toluene, and 25% ethyl alcohol (based on the total solvent mixtures in the stock solution) |
|---|---|
| 80% ethyl alcohol | 20% toluene, 1.05. |
| 50% ethyl alcohol | 50% toluene, 3.00. |
| 20% ethyl alcohol | 80% toluene, more than 4.50. |

"Formvar" solutions in 1-nitropropane also have a tolerance of more than 5.0 for a mixture of 50% ethyl acetate and 50% toluene. Similar solutions, on the other hand, have low tolerances for mixtures of methyl ethyl ketone and toluene and mixtures of methyl ethyl ketone and ethyl alcohol.

From the above, it is apparent that "Formvar" can be dissolved in mixtures of nitroalkanes, alcohols, and toluene, containing comparatively low proportions of nitroalkanes, thus serving to lower materially the costs of solvent compositions required for coating compositions and other purposes without reducing in any way the quality of the vinyl acetal resin film or other product made from the solution containing nitroalkanes.

The following formulae will illustrate the use of nitroalkanes in vinyl acetal resin coating compositions.

*Example I*

"Formvar" _____ 6 gms. per 100 cc. of solvent mixture
Butyl phthalate _____ 2 gms. per 100 cc. of solvent mixture dissolved in a solvent composition consisting of:

Mixed nitroalkanes [1] _____ per cent__ 30
Ethanol _____ do____ 20
Butanol _____ do____ 10
Toluene _____ do____ 40

[1] A mixture of nitromethane, nitroethane, 1-nitropropane, and 2-nitropropane obtained by the vapor phase nitration of propane in accordance with the process of U. S. Patent No. 1,967,667, by H. B. Hass, E. B. Hodge, and B. M. Vanderbilt.

*Example II*

"Formvar" _____ 6 gms. per 100 cc. of solvent mixture
"Rezyl 19" resin _____ 6 gms. per 100 cc. of solvent mixture
Butyl phthalate _____ 1.5 gms. per 100 cc. of solvent mixture dissolved in a solvent mixture consisting of:

1-nitropropane _____ per cent__ 30
Ethanol _____ do____ 15
Butanol _____ per cent__ 15
Toluene _____ do____ 20
Xylene _____ do____ 20

If desired, pigments, dyes, other resins, plasticizers and diluents may be incorporated in or substituted for the corresponding ingredients of the above examples. Such changes, however, will usually require that the character and extent of substitution may be determined by taking into consideration the customary factors such as tolerance, rates of evaporation, etc.

In connection with the use of nitroalkane solutions of vinyl acetal resins as coating compositions, it should be noted that such solutions tend to web when sprayed unless their viscosities are kept reasonably low, say about 40 centipoise. I have found that satisfactory results may be obtained by spraying a 6% solution of "Formvar" from solvent mixtures of either nitropropane-ethanol-toluene, or nitropropane-butanol-xylene. As is generally the case with materials possessing webbing tendencies, the latter solution can be sprayed satisfactorily at substantially higher viscosities than the more rapidly evaporating compositions such as the first named. This advantage, in the present case, however, is offset by the fact that solutions of "Formvar" in the nitropropane-butanol-xylene mixture are inherently substantially more viscous than solutions containing ethanol and toluene, so that the concentrations of vinyl acetal resin in sprayable solutions are substantially the same in both cases.

Now having described my invention, what I desire to claim is:

1. A composition of matter comprising a vinyl acetal resin formed by the condensation of formaldehyde with a partially hydrolyzed polyvinyl ester, and as a solvent therefor a nitroalkane having not in excess of five carbon atoms.

2. A composition of matter comprising a vinyl acetal resin formed by the condensation of formaldehyde with a partially hydrolyzed polyvinyl ester, and as a solvent therefor a nitroalkane containing from one to three carbon atoms.

3. A composition of matter comprising a vinyl acetal resin formed by the condensation of formaldehyde with a partially hydrolyzed polyvinyl ester, and as a solvent medium therefor a composition comprising a nitroalkane having not in excess of five carbon atoms, an aliphatic alcohol having less than 5 carbon atoms, and a liquid coal tar hydrocarbon.

4. A coating composition comprising a vinyl acetal resin formed by the condensation of formaldehyde with a partially hydrolyzed polyvinyl ester, said resin being dissolved in a sufficient quantity of a volatile solvent comprising a nitroalkane containing from one to three carbon atoms, to make a readily flowable composition adapted to produce resistant, adhesive and stable, protective, or ornamental surface coatings.

5. A coating composition comprising a vinyl acetal resin formed by the condensation of formaldehyde with a partially hydrolyzed polyvinyl ester, said resin being dissolved in a sufficient quantity of a volatile solvent comprising an aliphatic alcohol having less than 5 carbon atoms, a liquid coal tar hydrocarbon, and a nitroalkane containing from one to three carbon atoms, to make a readily flowable composition adapted to produce resistant, adhesive, and stable, protective, or ornamental surface coatings.

CHARLES BOGIN.